July 18, 1933.  A. E. RICE  1,918,500

WATER COOLED BRAKE RIM

Filed Dec. 17, 1930  2 Sheets-Sheet 1

Inventor
Allen Erwin Rice
By Lyon & Lyon
Attorneys

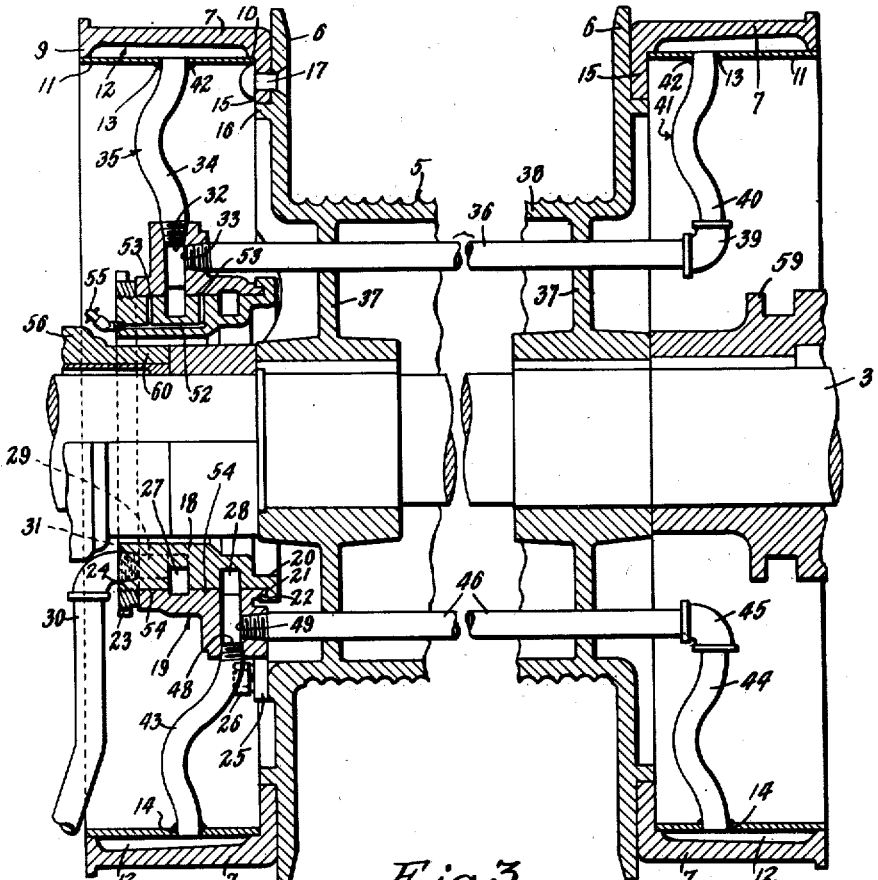

Patented July 18, 1933

1,918,500

UNITED STATES PATENT OFFICE

ALLEN ERWIN RICE, OF HERMOSA BEACH, CALIFORNIA, ASSIGNOR TO THE NATIONAL SUPPLY COMPANY, OF TOLEDO, OHIO, A CORPORATION OF OHIO

WATER COOLED BRAKE RIM

Application filed December 17, 1930. Serial No. 502,941.

This invention relates to water cooled brake rims, and is more particularly related to a rotary drawworks including a brake drum having brake rims at its opposite ends and which brake rims are provided with means for conducting from the brake rims heat as it is developed by the contacting of brake bands on the brake rims as the drum is rotated.

It is an object of this invention to provide a rotary drawworks including a brake rim with means for conducting from the brake rim heat as it is developed by the contacting of the brake band upon the brake rim as the drum of the drawworks is rotated.

Another object of this invention is to provide a water cooled brake rim construction including means for conducting to and confining within the brake rims water which is circulated around the brake rims and is conducted back to the water distributing means.

Another object of this invention is to provide a rotary drawworks including a drum having brake rims at its opposed ends and a water distribution system for conducting water to the brake rim for the purpose of conveying the heat developed by the contacting of the brake bands on the brake rims from the brake rim, which means are so constructed as to eliminate the necessity of drilling or boring the shaft upon which the brake drum is mounted.

Other objects and advantages of this invention it is believed will be apparent from the following detailed description of a preferred embodiment thereof as illustrated in the accompanying drawings.

In the drawings:

Figure 3 is a fragmental sectional view taken substantially on the line 3—3 of Figure 2.

Figure 4 is a fragmental sectional view taken substantially on the line 4—4 of Figure 2.

Figure 5 is a fragmental sectional view taken substantially on the line 5—5 of Figure 2.

Figure 2:
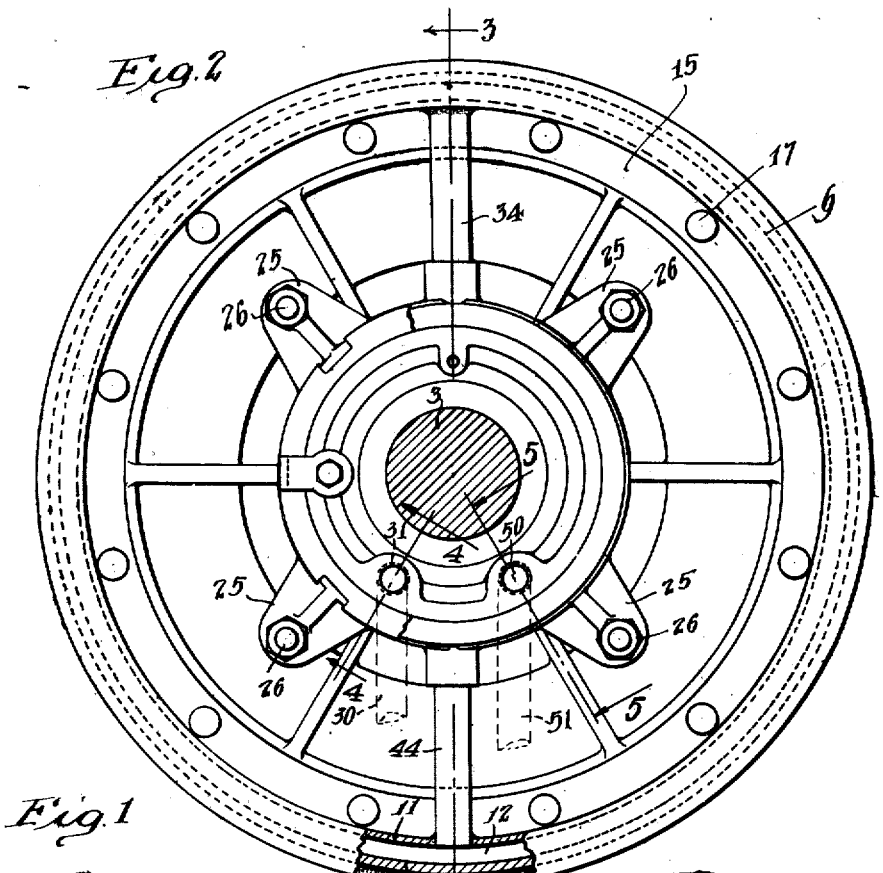
Figure 2 is an end elevation of the drawworks drum.
Figure 1:
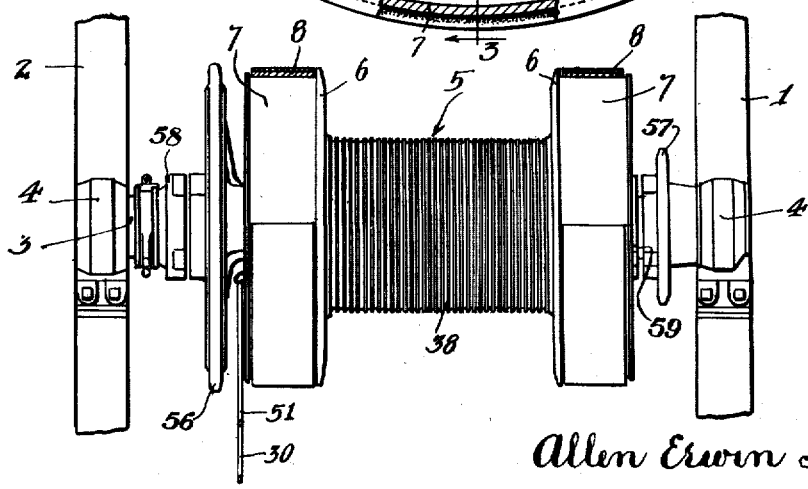
Figure 1 is a fragmental front elevation of a rotary drawworks illustrating the same as provided with water cooled brake rims embodying this invention.

In the preferred embodiment of my invention illustrated in the accompanying drawings, there is illustrated the frame of a drawworks which may be of any suitable form, and is herein illustrated as including right and left-hand posts 1 and 2 upon which the drum shaft 3 is rotatably supported in bearings 4. Journaled on the shaft 3 is the hoisting drum 5. The drum 5 is driven in any suitable or desirable manner, either from the shaft 3 or by a direct connection to the drum as journaled on the shaft 3. The manner of driving the drum is well understood in the art so that it is not believed necessary to herein specifically define this construction.

One form of drive is shown in the accompanying drawings and consists of driven sprockets 56 and 57 which are driven in a manner well understood in the art. Sprockets 56 and 57 are journaled on the shaft 3 and are selectively secured to the shaft 3 by means of clutches 58 and 59 splined on the shaft 3. In this construction it will be noted that the sprocket 56 has a hub 60 which projects within the space formed within the interior of the left-hand brake rim. The manifold ring 18 is of such size as to surround a portion of this sprocket hub. In this manner it is possible to materially reduce the over-all length of the drum shaft assembly, which is very essential to drawworks construction. It will be obvious that it is optional at which end the drawworks drum assembly manifold is mounted.

The drum 5 is provided at its opposed ends with outwardly extending flanges 6 to which brake rims 7 are secured. The brake rims 7 are provided with brake bands 8 which are adapted to be tightened to the brake rims 7 to retard the rotation of the drum 5.

The brake rims 7 are provided on their inner periphery with inwardly extending flanges 9 at their outer edges and are formed around their inner ends with shoulders 10. The shoulders 10 lie in substantially the same horizontal plane with the inner edge of the flanges 9.

Secured over the shoulders 10 and the inner edge of the flanges 9 is a plate 11 which defines a cooling chamber 12 within the periphery of the brake rims 7. Formed through the plates 11 are inlet and outlet passages 13 and 14 respectively. The brake rims 7 are flanged inwardly at their inner ends to provide inwardly extending annular flanges 15 which fit an annular rim 16 formed on the flanges 6 of the drawworks drum and the brake rims are held in position by any suitable or desirable means such, for example, as the rivets 17.

Mounted within the space formed within the interior of one of the brake rims 7, preferably at the left-hand end of the drawworks adjacent the post 1, is a water distribution manifold to which water to be circulated through the chambers 12 is delivered and to which the water after circulating through the chambers 12 is delivered and from which the water is conveyed from the drawworks structure.

As the drum is keyed to the shaft 3 and rotates with the shaft 3, the manifold includes a stationary manifold ring 18 and a rotating manifold ring 19. The stationary manifold ring surrounds the shaft 3 and is spaced therefrom and is held from rotation by any suitable or desirable form of bracket which extends beyond the end of the left-hand brake rim 7 and is fitted closely to the inner periphery of the revolving manifold ring 19.

The fit provided between the manifold rings 18 and 19 is such as to provide a fluid-tight joint. The manifold ring 18 is provided at its inner end with an outwardly extending flange 20 provided with an annular groove 21 into which the end 22 of the rotating manifold ring 19 is fitted. The opposite end of the manifold ring 18 is provided with a lock ring 23 which is threaded as indicated at 24 to the manifold ring 18 and provides at the outer end of the manifold ring 18 a means for preventing relative endwise movement of the manifold rings 18 and 19 while the flange 20 at the opposite end of the stationary manifold ring 18 provides at the inner end a means for holding the manifold rings 18 and 19 from relative axial movement.

The revolving manifold ring 19 is provided at points spaced around its periphery with bracket lugs 25 which extend outwardly from the manifold ring 19 and are secured to the drawworks drum by means of bolts 26.

Formed between the stationary manifold ring 18 and revolving manifold ring 19 are annular channels 27 and 28 which provide the inlet and discharge manifold passages. The annular grooves 27 are formed a portion of each in the adjacent faces of the manifold rings 18 and 19 and extend annularly around the rings 18 and 19.

Formed through the stationary manifold 18 is a manifold inlet 29 which is in open communication with the manifold inlet conduit 30 which is screw-threaded within the stationary manifold ring 18 as indicated at 31 and extends outwardly from the brake rims 7 and is connected to any suitable or desirable source of water under pressure.

At a point substantially diametrically opposite the manifold inlet 29 formed through the revolving manifold ring 19 is a pair of manifold outlets 32 and 33 which provide the outlet from the manifold through which the cooling water is conveyed to the chambers 12 formed within the brake rims 7 at the opposite ends of the drawworks drum structure. The outlet 32 is provided with a pipe 34 which is screw-threaded within the outlet 32 at one end and is curved as indicated at 35 intermediate its ends and extends upwardly and is connected in the inlet 13 formed through the plate 11 defining the cooling water chamber 12 for the left-hand rim 7. A pipe 36 is screw-threaded into the outlet 33 and extends through the bearing flanges 37 of the drawworks drum within the interior of the spooling portion 38 of the drawworks drum to a position within the periphery of the right-hand brake rim 7, and is at this position connected by means of an elbow 39 with a pipe 40 similar to the pipe 34, which is likewise curved at a point intermediate its ends as indicated at 41 and is at its upper end connected to the plate 11 at the inlet opening 13 thereof.

The pipes 34 and 40 are welded to the plates 11 as indicated at 42. The pipes 34 and 40 are curved intermediate their ends to permit expansion or contraction of the pipes 34 and 40 caused by the temperature differential set up during the circulation of the cooling water to and from the chambers 12.

The means provided for conducting the water from the chambers after it is circulated through the chambers 12 are substantially the same as provided for conducting the water to the chambers 12 and include outlets 14 formed in the plates 11 at points substantially diametrically opposite the inlets 13 and include curved pipes 43 and 44 similar to the curved pipes 34 and 40 and the pipe 44 from the outlet 14 of the chamber 12 of the right-hand brake rim 7 is connected by means of an elbow 45 to a pipe 46 which extends through the spooling portion 38 of the drawworks drum in the same manner as the pipe 36 is extended therethrough. The pipe 46 and the pipe 43 leading from the chamber 12 of the left-hand brake rim 7 are connected with manifold inlets 48 and 49 corresponding to the manifold outlets 32 and 33 but delivering into the discharge chamber 28 of the manifold provided by the stationary manifold ring 18 and the revolving manifold ring 19. The delivery from the manifold thus formed is formed in staggered relation to the inlet passage 29 and is indicated at 50. The manifold discharge 50 is connected with a pipe 51 which extends from the end of the left-hand brake rim 7 in substantially the same manner as does inlet conduit 30 and extends to a suitable point of disposal of the water which has been circulated through the chambers 12 to cool the brake rims 7.

Means are provided for lubricating the manifold provided by the stationary manifold ring 18 and the revolving manifold ring 19 which are herein illustrated as including a lubricant conduit 52 which is formed lengthwise of the stationary manifold ring 18 and is connected at points spaced along its length with transversely extending lubricant passes 53 formed through the stationary manifold ring 18 and extending outwardly to annular lubrication grooves 54 formed annularly around the inner periphery of the revolving manifold ring 19 between the contacting faces of the stationary and revolving manifold rings. Connected to the opposite end of the conduit 52 is a force lubrication fitting indicated at 55 through which grease may be forced to fill the annular grooves 54.

Having fully described my invention, it is to be understood that I do not wish to be limited to the details herein set forth, but my invention is of the full scope of the appended claims.

I claim:

1. In a hoisting apparatus, the combination of a drum shaft, a drum mounted thereon, the drum having annular flanges mounted at its opposed ends, brake rims supported by said annular flanges and providing annular chambers around said shaft at the ends of said drum, a cooling water manifold mounted in one of said annular chambers including a stationary portion and a portion adapted and secured to rotate with said drum, the cooling water manifold providing distribution and discharge manifolds, means connected with said distribution manifold for conveying cooling water to said brake rims, means for retaining the cooling water within and for causing the cooling water to circulate within said brake rims, means for returning the circulated cooling water to the discharge manifold, and means for conveying the returned cooling water from said discharge manifold.

2. In a hoisting apparatus, the combination of a drum shaft, a drum mounted thereon, the drum having flanges at its opposed ends, brake rims supported by said annular flanges and providing annular chambers around said shaft at the ends of said drum, a cooling water manifold mounted in one of said annular chambers, means connected with the manifold for conveying water to the opposed brake rims, means for retaining the cooling water within said brake rims, and means for returning the cooling water to the said manifold, and means for conducting the returned cooling water from said manifold.

3. In a hoisting apparatus, the combination of a drum shaft, a drum mounted thereon, the drum being provided with a spooling portion spaced from the shaft, the drum having flanges at its opposed ends, brake rims supported by said annular flanges and providing annular chambers around said shaft at the end of said drum, a cooling water manifold mounted in one of said annular chambers, conduits extending from the manifold to said brake rims, one of said conduits extending axially of the shaft within the spooling portion of the drum, means for retaining the cooling water within said brake rims and for causing the same to circulate around said brake rims, and means including a pair of conduits connected with said manifold for returning the circulated cooling water to the manifold, one of said conduits extending axially of the shaft within the spooling portion of said drum.

4. In a hoisting apparatus, the combination of a shaft, a drum mounted thereon, brake rims supported at the opposite ends of said drum, a cooling manifold mounted at one end of the drum, said cooling manifold including a stationary portion and a portion secured to and adapted to rotate with said drum, means for connecting the stationary and rotating portion in fluid-tight relation, the manifold providing distribution and discharge manifolds, means connected with the delivery manifold for conveying cooling water to the brake rims at the opposed ends of said drum, means for retaining the cooling water within said brake rims, means for returning the cooling liquid to the discharge manifold, and means for conveying the returned cooling water from said discharge manifold.

5. In a hoisting apparatus, the combination of a drum shaft, a drum mounted thereon, brake rims supported by said drum at the opposite ends thereof, a cooling water manifold mounted within the brake rim at one end of said drum, the cooling water manifold providing distribution and discharge manifolds, means for delivering cooling water to the distribution manifold, means including curved expansion pipes connecting the distribution manifold with the brake rims at the opposed ends of said drum, means for retaining the cooling water in and circulating the same around the brake rims, and means including curved expansion pipes for conveying the circulating cooling water to the discharge manifold.

6. In a hoisting apparatus, the combination of a drum assembly including a drum shaft, a spooling drum and a brake rim, means forming a chamber within the brake rim to retain circulating water therein, inlet and discharge connections communicating with said chamber, a rotary water circulating distributor and collector including complementary and relatively stationary and rotating portions mounted on the hoisting drum assembly, the stationary portion of said distributor and collector having separate intake and discharge connections for conveying water to and away from said distributor and collector, the rotating portion of said rotary distributor and collector including separate circulating passages in communication with the intake and discharge connections in the stationary portion of the rotary distributor and collector, and said circulating passages having separate means in communication with the inlet and discharge connections in the brake rim respectively.

7. In a hoisting apparatus, the combination of a hoisting drum assembly including a line spooling drum, a brake rim and a drum shaft, means for defining an enclosed cooling liquid within the brake rim, inlet and discharge connections communicating with the chamber, a rotary liquid circulating distributor and collector including complementary and relatively stationary and rotating portions, surrounding the drum shaft within the brake rim, the stationary portion of said distributor and collector having separate intake and discharge connections for conveying water to and away from the distributor and collector, the rotating portion of said rotary distributor and collector including separate circulating passages in communication with the intake and discharge connections in the stationary portion of the rotary distributor and collector, said circulating passages having separate means in communication with the inlet and discharge connections of the brake rim chamber respectively.

8. In a hoisting apparatus, the combination of a hoisting drum assembly including a spooling drum and a brake rim, a drum shaft upon which said drum assembly is mounted, means defining an enclosed cooling liquid chamber within the brake rim, a rotary circulating cooling liquid distributor and collector including complementary and relatively stationary and rotating portions mounted within the drum assembly, means connected with the rotating portion of the distributor and collector for conveying liquid to the brake rim and means for returning the cooling liquid to the distributor and collector, and means for conducting the returned cooling liquid from the stationary portion of the distributor and collector.

9. In a water cooled brake apparatus, the combination of a shaft, a brake rim mounted on the shaft, means defining an enclosed water circulating chamber around the brake rim, a rotary water circulating distributor and collector including complementary and relatively stationary and rotating portions mounted within the brake rim, the stationary portion of said distributor and collector having intake and discharge connections for conveying water to and away from said stationary portion, the rotating portion being adapted and secured to rotate with the brake rim, said rotating portion having separate passages in communication with the intake and discharge connections in the stationary portion, and conduit means between the brake rim circulating chamber and the rotating portion of the distributor and collector for conveying water to the brake rim from the distributor and collector, and return conduit means between the brake rim circulating chamber and the rotating portion of the distributor and collector for conveying water from the brake rim to said distributor and collector.

10. In a water cooled brake apparatus, the combination of a brake rim mounted on a shaft, means for defining an enclosed water circulating chamber around said brake rim, a rotary water circulating distributor and collector including complementary and relatively stationary and rotating portions mounted within the brake rim, the stationary portion of said distributor and collector having intake and discharge connections for conveying water to and away from said stationary portion, the rotating portion being adapted and secured to rotate with said brake rim, said rotating portion having separate passages in communication with the intake and discharge connections in the stationary portion, and conduit means between the brake rim circulating chamber and the rotating portion of the distributor and collector for conveying water from the brake rim to said distributor and collector, and means forming a portion of said conduit means between the distributor and collector and the circulating chamber operable to permit expansion of the brake rim.

11. In a hoisting apparatus, the combination of a hoisting drum assembly including a spooling drum, a brake rim and a drum shaft, means defining an enclosed cooling liquid chamber around said brake rim, a driven transmission member mounted on the shaft for driving said drum assembly including a hub extending within said brake rim, a circulating cooling liquid distributor and collector mounted within said brake rim and surrounding a portion of the hub projecting within the brake rim, means connected with the distributor and collector for conveying liquid to the brake rim, and means for returning the cooling liquid to the said distributor and collector, and means conducting the returned cooling liquid from said distributor and collector.

12. In a hoisting apparatus, the combination of a drum shaft, a spooling drum mounted thereon, a brake rim mounted in non-rotative relation with said spooling drum, and providing an annular chamber between the shaft and the inner periphery of the rim, a coolant distributor and collector mounted within said annular chamber and encircling the shaft, means for passing a cooling liquid to the distributor and collector, means for delivering the cooling liquid from the distributor and collector to the brake rim, means for returning the liquid to the distributor, and collector and means for conducting the liquid from the distributor and collector.

13. In a hoisting apparatus, the combination of a drum shaft, a spooling drum mounted thereon, a brake rim mounted in non-rotative relation with said spooling drum and providing an annular chamber between the shaft and the inner periphery of the rim, a coolant distributor and a coolant collector mounted within said annular chamber and encircling the shaft, means for passing a cooling liquid to the distributor, means for delivering the liquid from the distributor to the brake rim, means for returning the liquid to the collector, and means for conducting the liquid from the collector.

ALLEN ERWIN RICE.

CERTIFICATE OF CORRECTION.

Patent No. 1,918,500.      July 18, 1933.

ALLEN ERWIN RICE.

It is hereby certified that error appears in the printed specification of the above numbered patent requiring correction as follows: Page 4, line 24, claim 7, after "liquid" insert the word chamber; and that the said Letters Patent should be read with this correction therein that the same may conform to the record of the case in the Patent Office.

Signed and sealed this 14th day of November, A. D. 1933.

(Seal)

F. M. Hopkins
Acting Commissioner of Patents.

mounted thereon, a brake rim mounted in non-rotative relation with said spooling drum, and providing an annular chamber between the shaft and the inner periphery of the rim, a coolant distributor and collector mounted within said annular chamber and encircling the shaft, means for passing a cooling liquid to the distributor and collector, means for delivering the cooling liquid from the distributor and collector to the brake rim, means for returning the liquid to the distributor, and collector and means for conducting the liquid from the distributor and collector.

13. In a hoisting apparatus, the combination of a drum shaft, a spooling drum mounted thereon, a brake rim mounted in non-rotative relation with said spooling drum and providing an annular chamber between the shaft and the inner periphery of the rim, a coolant distributor and a coolant collector mounted within said annular chamber and encircling the shaft, means for passing a cooling liquid to the distributor, means for delivering the liquid from the distributor to the brake rim, means for returning the liquid to the collector, and means for conducting the liquid from the collector.

ALLEN ERWIN RICE.

CERTIFICATE OF CORRECTION.

Patent No. 1,918,500.  July 18, 1933.

ALLEN ERWIN RICE.

It is hereby certified that error appears in the printed specification of the above numbered patent requiring correction as follows: Page 4, line 24, claim 7, after "liquid" insert the word chamber; and that the said Letters Patent should be read with this correction therein that the same may conform to the record of the case in the Patent Office.

Signed and sealed this 14th day of November, A. D. 1933.

(Seal)

F. M. Hopkins
Acting Commissioner of Patents.

CERTIFICATE OF CORRECTION.

Patent No. 1,918,500.  July 18, 1933.

ALLEN ERWIN RICE.

It is hereby certified that error appears in the printed specification of the above numbered patent requiring correction as follows: Page 4, line 24, claim 7, after "liquid" insert the word chamber; and that the said Letters Patent should be read with this correction therein that the same may conform to the record of the case in the Patent Office.

Signed and sealed this 14th day of November, A. D. 1933.

F. M. Hopkins (Seal)  Acting Commissioner of Patents.